US010744428B2

United States Patent
Wyhler et al.

(10) Patent No.: US 10,744,428 B2
(45) Date of Patent: Aug. 18, 2020

(54) FILTER ELEMENT

(71) Applicant: Mann+Hummel GMBH, Ludwigsburg (DE)

(72) Inventors: Heiko Wyhler, Stuttgart (DE); Christine Oprisch, Oberriexingen (DE); Juergen Berrer, Oberstenfeld (DE); Thomas Friederich, Stuttgart (DE); Pavel Toufar, Trebic (CZ)

(73) Assignee: MANN+HUMMEL GmbH, Ludwigsburg (DE)

( * ) Notice: Subject to any disclaimer, the term of this patent is extended or adjusted under 35 U.S.C. 154(b) by 746 days.

(21) Appl. No.: 15/067,493

(22) Filed: Mar. 11, 2016

(65) Prior Publication Data
US 2016/0263495 A1    Sep. 15, 2016

(30) Foreign Application Priority Data
Mar. 11, 2015    (DE) .................. 10 2015 003 101

(51) Int. Cl.
*B01D 29/15*    (2006.01)
*B01D 35/18*    (2006.01)

(52) U.S. Cl.
CPC ............. *B01D 29/15* (2013.01); *B01D 35/18* (2013.01); *B01D 2201/296* (2013.01); *B01D 2201/305* (2013.01); *B01D 2201/60* (2013.01)

(58) Field of Classification Search
None
See application file for complete search history.

(56) References Cited

U.S. PATENT DOCUMENTS

| | | | | |
|---|---|---|---|---|
| 2,103,434 A | * | 12/1937 | Pennebaker | B01D 27/00 210/185 |
| 3,746,595 A | * | 7/1973 | Leason | B01D 29/111 156/245 |
| 4,126,559 A | * | 11/1978 | Cooper | B01D 29/15 210/445 |
| 4,130,622 A | * | 12/1978 | Pawlak | B01D 29/111 264/255 |
| 4,138,303 A | * | 2/1979 | Taylor, Sr. | B01D 29/012 156/264 |
| 4,187,091 A | * | 2/1980 | Durre | B01D 46/2411 210/493.1 |
| 4,406,326 A | * | 9/1983 | Wagner | B01D 29/111 166/227 |
| 4,406,785 A | * | 9/1983 | Siefer | B01D 35/18 210/186 |

(Continued)

FOREIGN PATENT DOCUMENTS

| | | |
|---|---|---|
| CN | 104208942 A | 12/2014 |
| CN | 104343598 A | 2/2015 |

(Continued)

*Primary Examiner* — Robert J Popovics
(74) *Attorney, Agent, or Firm* — James Hasselbeck (57) ABSTRACT

A filter element for a fluid, including: an elongated grid-type supporting element; a filter medium supported on the supporting element; wherein the support element and filter medium is configured such that the fluid flows through the filter medium in a direction radially to a longitudinal axis of the filter element; wherein the supporting element is a grid plate and/or the filter medium is embedded in the material of the supporting element at least in some sections.

4 Claims, 6 Drawing Sheets

(56) References Cited

U.S. PATENT DOCUMENTS

| | | | | |
|---|---|---|---|---|
| 4,479,477 | A * | 10/1984 | Manchester | B01D 35/18 123/557 |
| 4,539,108 | A * | 9/1985 | Izutani | B01D 35/18 210/104 |
| 4,596,224 | A * | 6/1986 | Prager | B01D 35/18 123/557 |
| 4,603,244 | A * | 7/1986 | Genz | F02M 31/125 219/205 |
| 4,844,793 | A * | 7/1989 | Izutani | B01D 17/00 210/97 |
| 4,861,966 | A * | 8/1989 | Matthiesen | H01C 7/027 219/205 |
| 4,866,250 | A * | 9/1989 | Pasbrig | F02M 37/30 392/479 |
| 4,882,055 | A * | 11/1989 | Stamstad | B01D 29/111 210/483 |
| 5,252,204 | A * | 10/1993 | Chiodo | B01D 29/111 210/232 |
| 5,266,194 | A * | 11/1993 | Chiodo | B01D 29/111 210/232 |
| 5,326,461 | A * | 7/1994 | Legrand | B01D 35/18 210/186 |
| 5,342,513 | A * | 8/1994 | Wall | E04H 4/1609 15/1.7 |
| 5,417,906 | A * | 5/1995 | Chiodo | B01D 29/111 264/153 |
| 5,876,599 | A * | 3/1999 | Sylvester | B01D 29/21 210/232 |
| 5,900,140 | A * | 5/1999 | Nagai | B01D 29/014 210/85 |
| 6,177,658 | B1 * | 1/2001 | White | B01D 35/18 219/535 |
| 6,206,090 | B1 * | 3/2001 | Rago | B01D 29/15 165/119 |
| 6,328,883 | B1 * | 12/2001 | Jensen | B01D 27/00 210/136 |
| 6,382,190 | B1 * | 5/2002 | Tanabe | B01D 29/071 123/509 |
| 6,402,943 | B1 * | 6/2002 | Bohlender | B01D 35/18 210/184 |
| 6,722,508 | B2 * | 4/2004 | Parker | B01D 29/111 210/448 |
| 6,846,415 | B2 | 1/2005 | Baz | |
| 6,994,784 | B2 * | 2/2006 | Jainek | B01D 35/147 210/149 |
| 7,479,219 | B2 * | 1/2009 | Rassinger | B01D 29/114 210/130 |
| 7,645,313 | B2 | 1/2010 | Lampert et al. | |
| 7,828,155 | B2 | 11/2010 | Proulx et al. | |
| 8,038,872 | B2 * | 10/2011 | Jokschas | B01D 27/08 210/86 |
| 8,038,878 | B2 * | 10/2011 | Hewkin | B01D 35/027 137/544 |
| 8,057,687 | B2 * | 11/2011 | Jainek | B01D 35/147 210/767 |
| 8,114,278 | B2 * | 2/2012 | Lorente | B01D 27/148 210/188 |
| 8,231,779 | B2 * | 7/2012 | Jokschas | B01D 27/08 210/86 |
| 8,282,819 | B2 * | 10/2012 | Parra Navarrete | B01D 35/18 210/184 |
| 8,377,295 | B2 * | 2/2013 | Strassenberger | B01D 35/30 210/184 |
| 8,641,896 | B2 * | 2/2014 | Remacha | B01D 35/18 210/184 |
| 9,194,343 | B2 * | 11/2015 | Thienel | B01D 17/045 |
| 9,427,685 | B2 * | 8/2016 | Pekarsky | B01D 35/0273 |
| 9,675,921 | B2 * | 6/2017 | Bahnen | B01D 46/2407 |
| 9,808,750 | B2 * | 11/2017 | Klein | B01D 35/18 |
| 9,937,788 | B1 * | 4/2018 | Tsukahara | B60K 15/03 |
| 10,145,341 | B2 * | 12/2018 | Kim | F02M 37/14 |
| 10,154,751 | B2 * | 12/2018 | DeMiglio | A47J 31/0689 |
| 10,272,368 | B2 * | 4/2019 | Klein | B01D 35/147 |
| 10,307,701 | B2 * | 6/2019 | Klein | H05B 3/0014 |
| 10,436,161 | B2 * | 10/2019 | Kim | F02M 37/14 |
| 10,441,904 | B2 * | 10/2019 | Levi | B01D 35/31 |
| 2003/0116490 | A1 * | 6/2003 | Keyster | B01D 35/18 210/184 |
| 2004/0050371 | A1 * | 3/2004 | Baz | B60K 15/077 123/509 |
| 2006/0249499 | A1 * | 11/2006 | Winkler | B60H 1/00464 219/202 |
| 2007/0114169 | A1 * | 5/2007 | Suzuki | B01D 29/012 210/441 |
| 2007/0221554 | A1 * | 9/2007 | Wright | B01D 35/1475 210/120 |
| 2008/0197064 | A1 * | 8/2008 | Blasco Remacha | B01D 35/18 210/184 |
| 2008/0296288 | A1 * | 12/2008 | Girondi | B01D 35/18 219/552 |
| 2010/0132817 | A1 * | 6/2010 | Hewkin | B01D 35/027 137/544 |
| 2010/0200485 | A1 * | 8/2010 | Parra Navarrete | B01D 35/18 210/184 |
| 2010/0258491 | A1 * | 10/2010 | Jokschas | B01D 27/08 210/181 |
| 2011/0210053 | A1 * | 9/2011 | Strassenberger | B01D 35/30 210/184 |
| 2012/0037548 | A1 * | 2/2012 | Jokschas | B01D 27/08 210/86 |
| 2014/0076795 | A1 * | 3/2014 | Pekarsky | B01D 35/0273 210/348 |
| 2014/0345719 | A1 * | 11/2014 | Kim | F02M 37/50 137/544 |
| 2014/0353229 | A1 | 12/2014 | Klein | |
| 2014/0353230 | A1 * | 12/2014 | Klein | B01D 35/18 210/185 |
| 2014/0373495 | A1 | 12/2014 | Madeira et al. | |
| 2015/0375148 | A1 * | 12/2015 | Klein | B01D 46/521 210/186 |
| 2016/0263495 | A1 * | 9/2016 | Wyhler | B01D 29/15 |
| 2017/0056792 | A1 * | 3/2017 | Klein | B01D 29/071 |
| 2017/0241387 | A1 * | 8/2017 | Hummel | B01D 29/05 |
| 2017/0241388 | A1 * | 8/2017 | Hummel | B01D 29/07 |
| 2017/0276106 | A1 * | 9/2017 | Girondi | B01D 36/005 |
| 2019/0063383 | A1 * | 2/2019 | Kim | F02M 37/50 |
| 2020/0054973 | A1 * | 2/2020 | Wildermuth | H01M 8/04044 |

FOREIGN PATENT DOCUMENTS

| | | | | |
|---|---|---|---|---|
| DE | 19624523 | A1 | 1/1998 | |
| DE | 19735992 | A1 | 2/1999 | |
| DE | 102011111520 | A1 | 2/2013 | |
| DE | 102011111527 | A1 | 2/2013 | |
| DE | 102013217333 | A1 | 5/2014 | |
| DE | 102015003098 | A1 * | 9/2016 | B01D 35/18 |
| DE | 102015003101 | A1 * | 9/2016 | B01D 29/15 |
| DE | 102017007690 | A1 * | 2/2019 | B01D 29/52 |
| EP | 1144078 | B1 | 4/2003 | |
| EP | 1985838 | A1 * | 10/2008 | F02M 37/22 |
| EP | 1985839 | A1 * | 10/2008 | F02M 37/22 |
| EP | 1985839 | A1 | 10/2008 | |
| EP | 1985839 | B1 * | 2/2017 | F02M 37/22 |
| JP | 61157313 | A | 7/1986 | |

\* cited by examiner

FILTER ELEMENT

TECHNICAL FIELD

The invention relates to a filter element for filtering a fluid and a filter element arrangement having such a filter element.

BACKGROUND OF THE INVENTION

In practice, filter elements are used to separate impurities that are present in a fluid from that fluid. The filter elements usually have an elongated grid-type supporting element. A filter medium through which fluid can flow in a direction radially to the longitudinal axis of the filter element is supported on the supporting element.

Such filter elements are used in filtering (diesel) fuels or urea solutions, for example, which are used for reducing nitrogen oxides in the exhaust gas from internal combustion engines in motor vehicles. In practice, however, the installation space available for the filter element, in particular in a motor vehicle, is often extremely limited and has a complex geometry, not least of all because of other components. Installation of the aforementioned filter elements is therefore frequently difficult.

SUMMARY OF THE INVENTION

The object of the invention is therefore to provide a filter element, which may have a more compact design on the whole, with an unchanged filtration capacity and can be adapted even to complex installation spaces, so that the filter element has improved flexibility in use on the whole.

The object according to the invention is thus achieved by a filter element for a fluid, having an elongated grid-shaped supporting element and having a filter medium, which is supported on the supporting element, such that a fluid flows through the filter medium it in a direction radially to the longitudinal axis of the filter element, such that the supporting element is designed as a grid plate and/or the filter element is embedded in the material of the supporting element in some sections.

The filter element according to the invention may be implemented with the supporting element designed as a grid plate and/or when the filter medium is embedded in the material of the supporting element in some sections, and may thus be designed to be more compact on the whole but with no change in filtration power, even with a smaller cross section than is the case with the known filter elements, with a grid-shaped supporting element embodied as a supporting pipe, for example. Consequently, the filter element itself can be used in constricted installation conditions that would have been unsuitable for installation of a filter element in the past. In addition, the filter element can be manufactured inexpensively with a low expenditure of material and labor. The supporting element ensures reliable support of the filter medium, so that it does not collapse under the compressive load of the fluid flowing during operation.

The supporting element may be designed in the form of a supporting cage. In this case, the supporting element is more preferably designed to be closed on all sides radially in relation to the longitudinal axis of the filter element.

The grid plate of the filter element according to the invention may have a basic planar shape or a basic curved shape, i.e., in the form of a segment of a circle or a corrugated basic shape, for example. The filter element can therefore be better adapted again to an installation space of a complex design. The filter medium is preferably arranged in a manner corresponding to that of the grid plate in at least some sections.

According to one embodiment of the invention, the filter medium may be embedded in the material of the supporting element in some sections. The supporting element may be integrally molded on the filter medium in particular. This offers advantages in terms of the manufacturing technology. With this embodiment, the supporting element and the filter medium together form an inseparable unit and can be mounted jointly in the respective installation position.

According to an alternative embodiment of the invention, the filter medium is arranged in a ring shape around the supporting element, in particular in a ring shape around the supporting element in the form of a grid plate. In this case, the filter medium may be in pleated form in particular as filter bellows. Therefore, a particularly large effective filter surface area may be made available for the fluid to be filtered.

According to the invention, the supporting element may be provided with an end plate on one or both ends. A further improvement in the mechanical stability of the filter element can be achieved by means of these end plates. In addition, the mounting of the filter element can therefore be simplified further, and sealing of a crude side that is to be separated from the clean side of the filter element is possible. The end disk and/or end disks may be provided in particular with a sealing element, by means of which a sealing contact with a filter housing or the like is made possible.

The aforementioned end disk or end disks may advantageously be shaped according to technical manufacturing aspects of the supporting element.

The supporting element may be made of plastic for cost reasons. The supporting element is especially preferably designed as an injection molded part. The supporting element can therefore be embodied easily and inexpensively in practically any freely selectable shape. The supporting element in this case is preferably made of a thermoplastic polymer.

The at least one end disk of the filter element may have a continuous opening for the fluid. In this case, the grid plate is arranged at a distance axially from the continuous opening in order to ensure free flow of fluid through the continuous opening.

At low ambient temperatures, an unwanted increase in viscosity may occur, or in the case of diesel fuels, there may be flocculation of paraffins. It is known that, if the temperature drops below the freezing point of the respective fluid to be filtered, freezing of the fluid may occur. The invention therefore also includes a filter element arrangement with a filter element of the type described previously and a heating element. In the case of a filter medium through which the fluid flows radially from the outside to the inside, the heating apparatus is preferably arranged on the outside of the filter element and preferably extends completely around it.

According to the invention, the heating device additionally preferably includes an electric heating foil with a resistance heating element laminated between two plastic films, wherein the heating foil has electric terminal contacts by means of which the heating foil can be connected to an electric power supply. The heating device may have a first and a second flat heat conducting element between which the heating foil is arranged. The two heat conducting elements are embedded in an outer plastic layer together with the electric heating foil, wherein the electric terminal contacts of the heating foil lead out of the plastic layer.

The heating device preferably has one or more through-openings for the fluid to be heated. This heating device is characterized by the use of a flexibly deformable heating foil such as that freely available in prefabricated form on the market, also low heating costs and a highly flexible design. The surface heating element can therefore be implemented on the whole with a planar, curved, ring-shaped, banana-shaped or even corrugated design and thus adapted easily to the shape of the filter element. In addition, the use of the standardized heating foils allows a narrow tolerance in the heating power of the heating device. This offers a reliable heating effect as well as safety advantages.

Due to the fact that the heating foil is arranged between the two flat heat conducting elements and is cast together with them in the plastic layer, this yields a dimensionally stable sandwich design of the heating device on the whole. The two heat conducting elements ensure a uniform release of heat over the surface of the heating device. Due to the plastic layer as well as the two heat conducting elements, the heating foil can be reliably protected from any excess mechanical stress, for example due to a freezing pressure of the fluid such as that which is imminent when the heating device is not in operation. In the same way, penetration of fluid can be suppressed by the plastic layer, i.e., the plastic sheathing of the heating device even at high operating pressures in the area of the electric contacts of the heating foil. The current-carrying resistance heating elements are therefore optimally protected from chemical or physical influences of the fluid to be heated.

The plastic layer may be made of a thermoplastic material, which is advantageous from the standpoint of the manufacturing technology.

According to a particularly preferred refinement of the invention, the heating device has one or more through-openings for the fluid to be heated. Such a through-opening permits a continuous flow through the heating device in a direction of flow running obliquely to the surface of the surface heating element. The surface heating element therefore has an even broader spectrum of use and can be used in a filter element for filtering the fluid, for example. It should be noted that, due to the size and shape of the through-opening(s), a turbulent flow of fluid can be created and/or facilitated; this is advantageous for the most efficient possible transfer of heat from the heating device to the fluid.

According to the invention, the electric contacts of the heating foil can each be connected to an electric plug connector, which is partially embedded in the plastic layer. A mechanically stable connection for a coupling part of an electric terminal cable can therefore be implemented.

A joining means for the aforementioned coupling part of the electric terminal cable is especially preferably integrally molded on the plastic layer. The joining means may be designed in particular as a screw thread for screw connection of a union nut. As an alternative to this, the joining means may be embodied in the form of one or more catch means for catch engagement of the coupling part. Meanwhile, the joining means is an integral component of the plastic layer and can be created together with it in an inexpensive manner by means of an injection molding method.

For a further improvement in the sealing of the surface heating element in the area of its electric contacts, it has been found to be advantageous if the surface heating element has a sealing element, by means of which the coupling part can be sealed. In the simplest case structurally, the sealing element may be embodied as an O-ring having rubber elastic deformability. The heating device in this case advantageously has an integrally molded shoulder on the plastic layer, for example, a ring groove on which the sealing element can be supported, forming a seal.

The two heat conducting elements are preferably made of the same material. For the purpose of good thermal conductivity, these two elements may be made of metal or a metal alloy in particular. The heat conducting elements are especially preferably embodied as metal plates.

According to a particularly preferred refinement of the invention, the plastic layer is provided with fastening means by which the heating device can be fastened onto the filter element, onto the filter housing or inside a fluid tank. The fastening means are advantageously integrally molded on the plastic layer from the standpoint of manufacturing technology and are therefore designed as an integral component of the heating device. In the simplest case the fastening means may be embodied at least partially as snap tongues. The heating device can therefore be fastened in its installed position without the use of tools, for example, on the filter element and/or on the filter housing or also in the fluid tank of a motor vehicle.

The invention is explained in greater detail below on the basis of exemplary embodiments shown in the drawings. The feature shown here may be implemented individually either alone or in multiples in any combination in variants of the invention.

DESCRIPTION OF THE INVENTION

Figure 1:
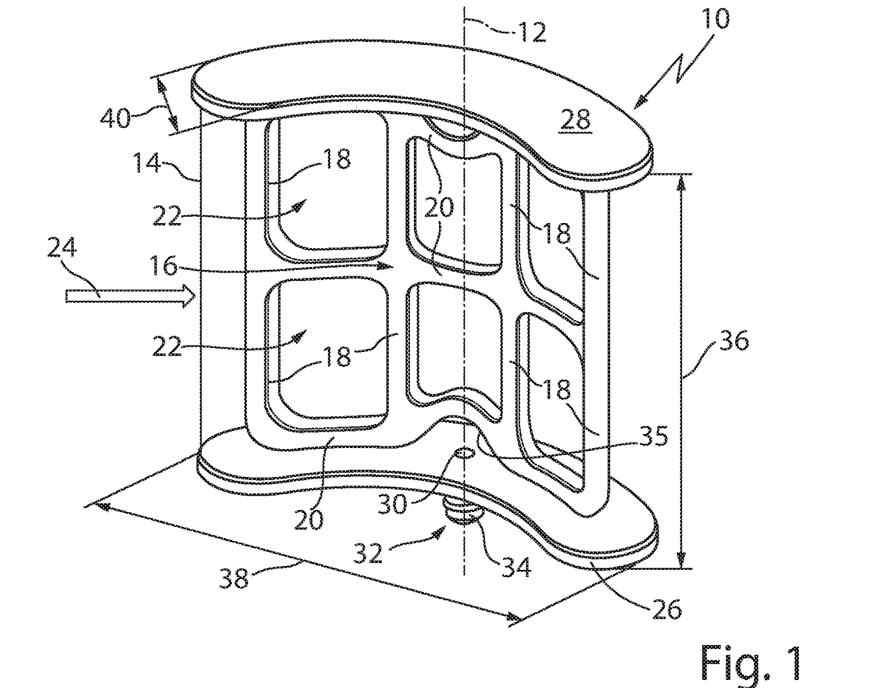
FIG. 1 shows a filter element for a fluid having a fluid medium through which the fluid can flow in a direction radially to the longitudinal axis of the filter element and which is supported on a curved grid plate on the inside.
Figure 8:
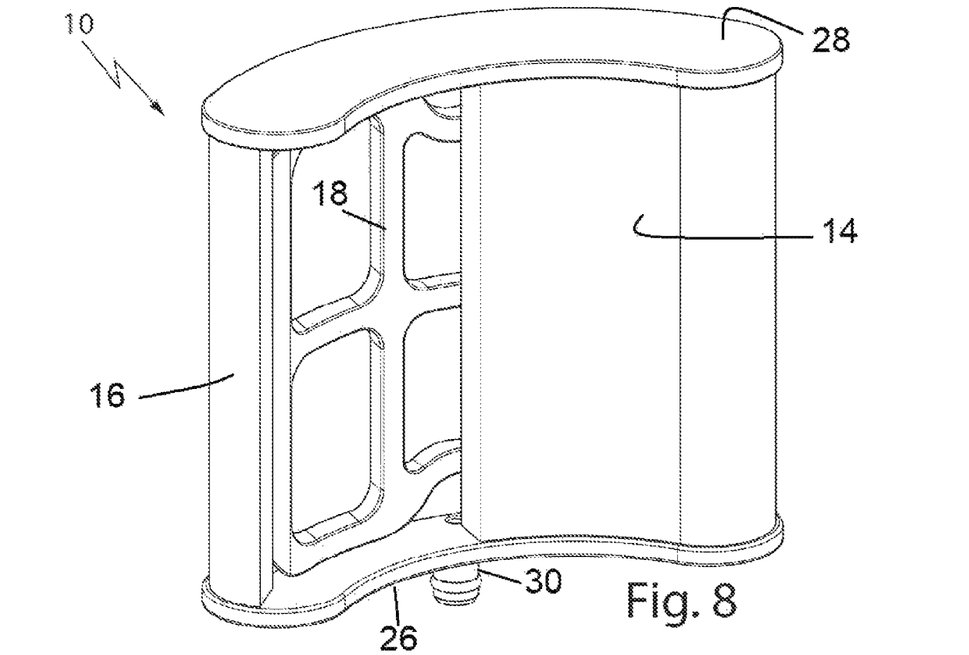
FIG. 8 shows an alternative embodiment of FIG. 1.

FIG. 1 shows a filter element 10 for filtering a fluid containing impurities. In the present case, for example, the filter element has an essentially kidney-shaped or banana-shaped basic design with a longitudinal axis 12. The filter element 10 may also have a different basic design, if this is required by the geometry of the respective installation space of the filter element 10. The filter element 10 has at least one filter medium 14. The filter medium 14 is shown as transparent in FIG. 1 for reasons of illustration. FIG. 8 shows an alternative view of the filter element 10. The filter medium 14 is supported on the inside on a supporting element 16, which is embodied as a grid plate and is arranged in a ring shape around the supporting element 16.

The supporting element 16 has a curved width, which is due to the desired basic shape of the filter element 10. Longitudinal and transverse webs of the supporting element 16 are labeled as 18 and 20, respectively. The longitudinal and transverse webs define the first through-openings 22 for the fluid 24 (represented here in the form of an arrow).

At one end, a first end disk 26 is arranged on the supporting element 16, and a second end disk 28 is also arranged at the other end. The supporting element 16 and the two end disks 26, 28 are formed together in one piece in this case. The two end disks 26, 28 may be integrally molded on the supporting element 16. As an alternative, supporting element 16 in the form of a grid plate may be arranged loosely between the end disks 26, 28. The filter medium 14 is arranged between the two end disks 26, 28 and is covered by them with a protective effect in the axial direction. During operation of the filter element 10, the fluid 24 to be cleaned flowing through the filter medium 14 from the outside to the inside in a direction radially to the longitudinal axis 12 of the filter element 10.

In the present case, the filter medium 14 is embodied as filter bellows and extends around the full circumference of the supporting element 16. The filter medium 14 is in contact with the inside of the supporting element 16, which thus counteracts collapse of the filter medium 14 under the pressure of the fluid 24 during operation of the filter element 10. For reasons of stability and/or sealing, the filter medium 14 is arranged so that it is embedded in the front end of the material of the two end disks 26, 28. The first end disk 26 has a fluid outlet 30, which is designed as a through-opening, which is fluidically connected to an outlet connection 32 of the filter element 10. The outlet connection 32 may be provided with a sealing element 34, for example, an O-ring, as shown in FIG. 1, to be able to insert the outlet connection 32 of the filter element into an outlet pipe on the installation end, so as to form a seal. The supporting element 16 or, more precisely, the lower transverse web 20 of the supporting element 16 shown in FIG. 1, has an indentation 35 in the region of the outlet 30, so that the supporting element 16 is arranged at an axial distance from the fluid outlet 30. Unhindered outflow of the fluid 24 out of the interior of the filter element 10 and through the fluid outlet 30 is therefore made possible.

The length and/or structural height of the filter element 10 is labeled as 36, the width is labeled as 38 and the thickness as 40.

Due to the insertion of a supporting element 16, the filter element 10 may be supplied with a small thickness 40 and with a shape which is coordinated with and/or aimed at the geometry of a predetermined installation space and in particular deviates from a circular shape.

Figure 2:
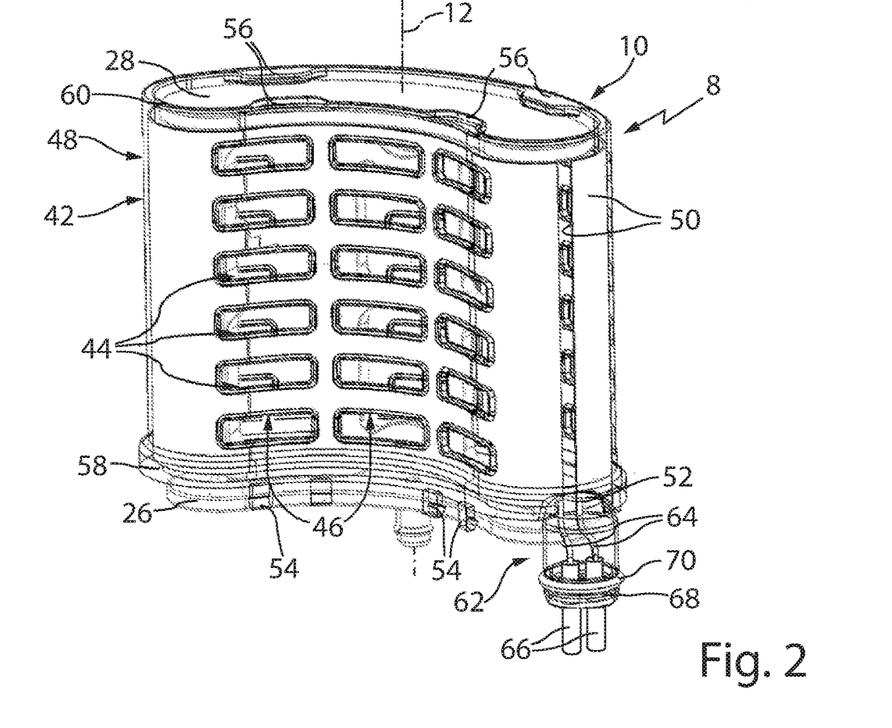
FIG. 2 shows a filter element arrangement having the filter element from FIG. 1 and a heating device pushed onto the filter element, arranged on the filter element with a catch lock.

FIG. 2 shows a filter element arrangement 8 with the filter element 10 from FIG. 1 and a heating device 42 for the fluid 24, mounted on the filter element 10 (see FIG. 1). The heating device 42 is designed in the form of a sleeve or cuff and has a basic shape corresponding to the basic shape of the filter element 10. The heating device 42 may be designed in particular in the form of a closed ring relative to the longitudinal axis 12 of the filter element 10, as is the case with the heating device 42 shown in FIG. 2. The heating device 42 extends around the outside of the filter element 10, so that the heating device is arranged upstream fluidically from the filter element 10. The fluid 24 (see FIG. 1) can therefore be heated and/or warmed up even before the flow of filter medium 14 reaches the filter element 10 (see FIG. 1).

According to FIG. 2, the heating device 42 has a plurality of second flow-through openings 44 (at the side) for the fluid around the circumference. These through-openings 44 may each be designed in the form of a slot. The through-openings 44 may be aligned in a row 46 one after the other in the axial direction, and a plurality of such rows 46 may be arranged in groups over the circumference of the heating device 42.

The heating device 42 is characterized by a multilayer structure. The surface of the heating device 42 is formed by a fluid-tight plastic layer 48 on the whole. The plastic layer 48 consists of a thermoplastic polymer. Two elongated curved heat conducting elements 50 are embedded in the plastic layer 48, in particular completely embedded as shown in greater detail in FIG. 3. A heating foil 52, which is flexible in the dismantled state, is arranged between the two heat conducting elements 50. In other words, the heating foil 52 as well as the two heat conducting elements 50 are arranged in the plastic layer 48, where they are completely embedded. The heating foil 52 is essentially covered at the side by the two heat conducting elements 50. The two heat conducting elements 50 are each made of metal and serve to reinforce the heating foil 52. In addition, the heat conducting elements 50 ensure a uniform and effective transfer of heat from the heating foil 52 to the fluid 24 flowing toward the heating device 42 (see FIG. 1).

First and second fastening means 54, 56 are used to fasten the heating device 42 onto the filter element 10. The first fastening means 54 are each designed in the form of snap tongues. These snap tongues protrude away from the lower edge 58 of the heating device 42 in the direction of the longitudinal axis 12 of the filter element 10 and are thus locked with the first end disk 26 of the filter element 10. The second fastening means 56 protrude inward away from the upper edge 60 of the heating device 42 and are designed as tongue-shaped profile protrusions of the plastic layer 48. The filter element 10 with its second end disk 28 is in contact with the second fastening means 56 in the form of tongues on the heating device 42. The second fastening means 56 serve as an axial stop for the heating device 42 when the heating device 42 is pushed onto the filter element 10. The filter element 10 is arranged so that it is held in a fixed position axially inside of the heating device 42. The filter element 10 and the heating device 42 may be replaced as needed independently of one another.

The filter element 10 may be installed individually or jointly with the heating device 42 in the tank of a motor vehicle, in particular a tank for supplying a urea solution.

The heating device 42 also has a connection region designated as 62 for a heating cable (not shown) by means of which the heating foil 52 can be connected to an electric power source (not shown). Two electric terminal contacts 64 of the heating foil 52 are held at each end in an electric plug connector 66. The two electric plug connectors 66 are embedded in the outer plastic layer 48 of the heating device in some sections and are therefore held in the plastic layer 48 with a seal and in a fixed position relative to one another. Unwanted penetration and advance of the fluid toward the heating foil 52 can therefore be reliably suppressed.

The connecting region 62 has a joining means 68 integrally molded on the plastic layer 48 and/or formed by the plastic layer for a coupling part of the electric connecting cable. The joining means 68 may be designed as a screw thread, as shown in FIG. 2, for a screw connection of a union nut (not shown). For additional sealing of the coupling part with respect to the connecting region 62, an elastically deformable sealing element 70 embodied as an O-ring is used.

Figure 3:
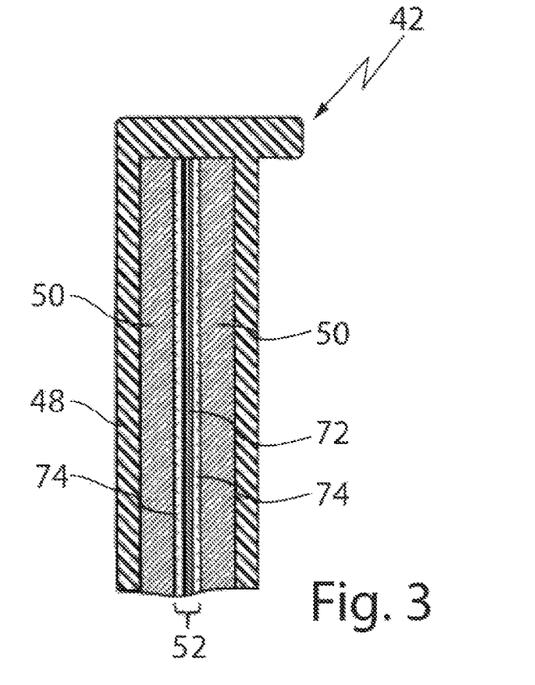
FIG. 3 shows a longitudinal section through the filter element according to FIG. 1.

FIG. 3 shows the wall structure of the heating device 42 in a detailed drawing of one section. The heating from 52 has a centrally arranged resistance heating element 72, which is laminated between two plastic films 74. The resistance heating element 72 may have electrically conductive metal wires or plastic fibers and/or plastic nanotubes, for example. The heating foil 52 is in turn in contact with the heat conducting elements 50. The plastic layer 48 completely surrounds the heating foil 22 and the heat conducting elements 50.

Because of the multiply encapsulated arrangement of the resistance heating element 72, the heating device 42 may be used for heating aggressive fluids such as a urea solution, for example, as well as for high-pressure applications without causing any risk of damage to the resistance heating element 72 and/or to the heat conducting elements 50 by the fluid 24. The heating foil 52 is designed for operation on a DC voltage source. The heating foil 52 may also be designed for an AC voltage operation.

Figure 4:
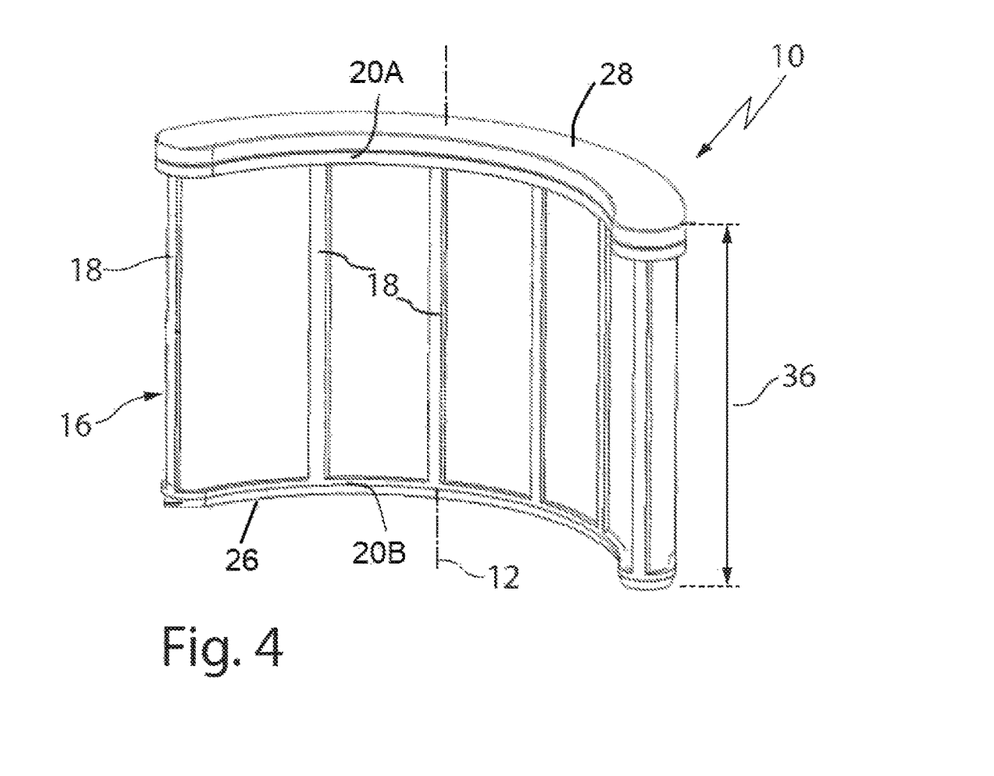
FIG. 4 shows another filter element having a supporting body in the form of a supporting cage, in which the filter medium is held embedded in the material of the supporting body in some sections.

FIG. 4 shows another filter element 10, which differs from the filter element 10 shown in FIG. 1 essentially in that the supporting element 16 is designed in the form of a cage and is integrally molded on the filter medium 14. The filter element 10 is therefore arranged so that it is retained in the material of the supporting element 16 in some sections. The filter medium 14 is designed so that it is closed in the form of a ring together with the supporting element 16 relative to the longitudinal axis 12 of the filter element 10 and is reinforced in its ring-shaped arrangement by the longitudinal webs 18 and the upper and lower transverse webs 20 of the supporting element 16. The length of the filter element 10, i.e., its extent in the direction of the longitudinal axis 12 is designated as 36.

Figure 9:
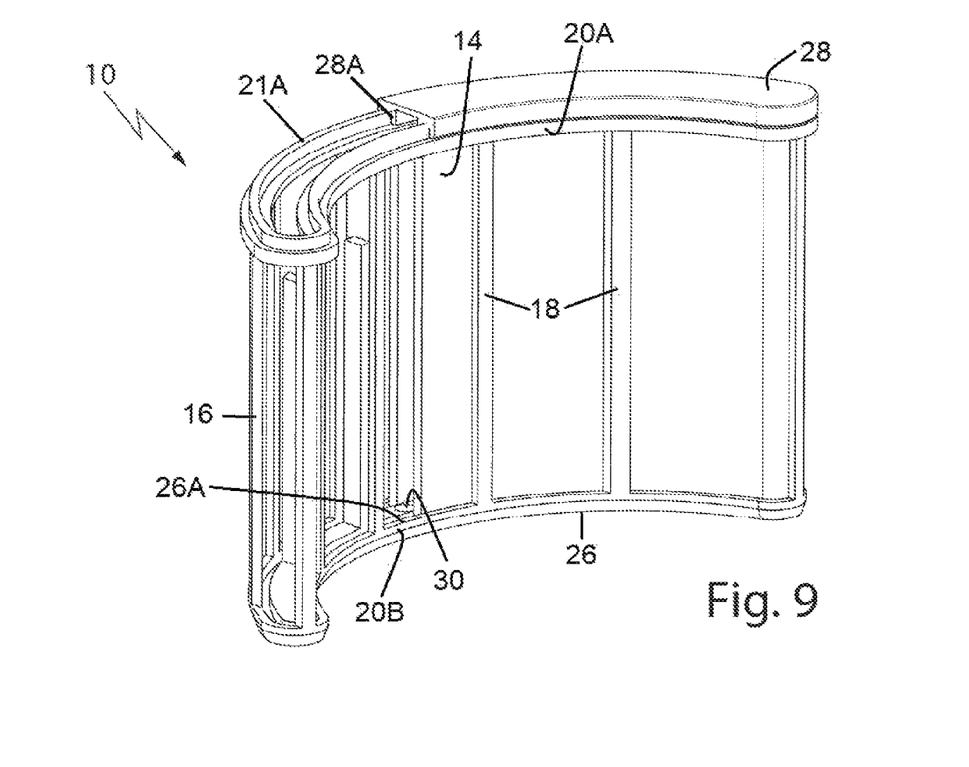
FIGS. 9-11 show alternative embodiments and forms of representation of a filter element.
Figure 10:
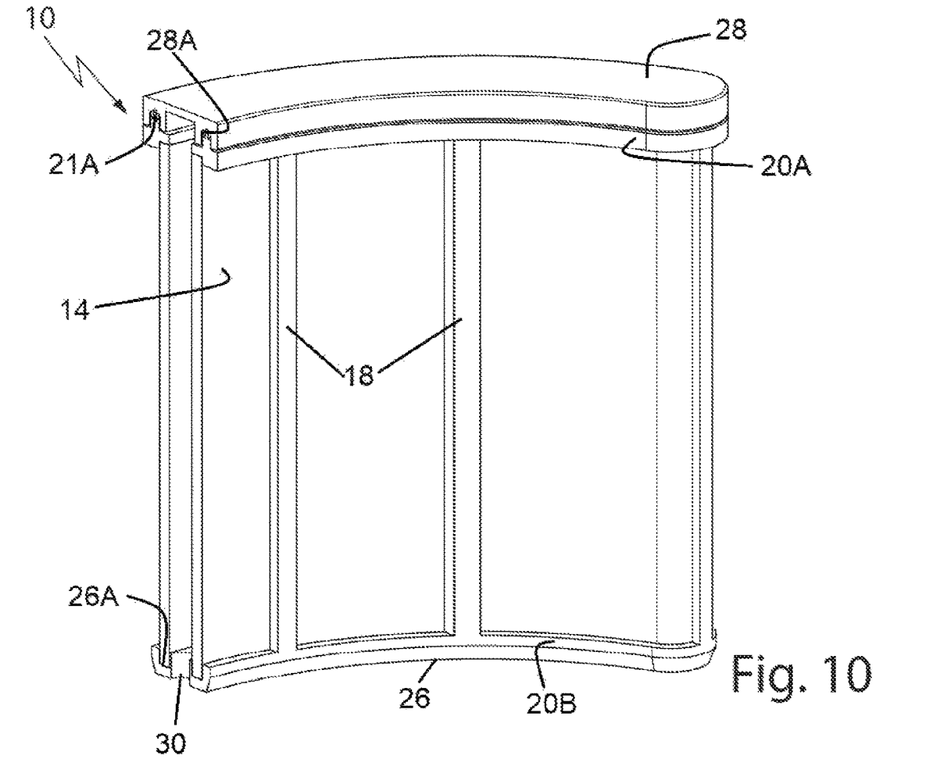
Figure 11:
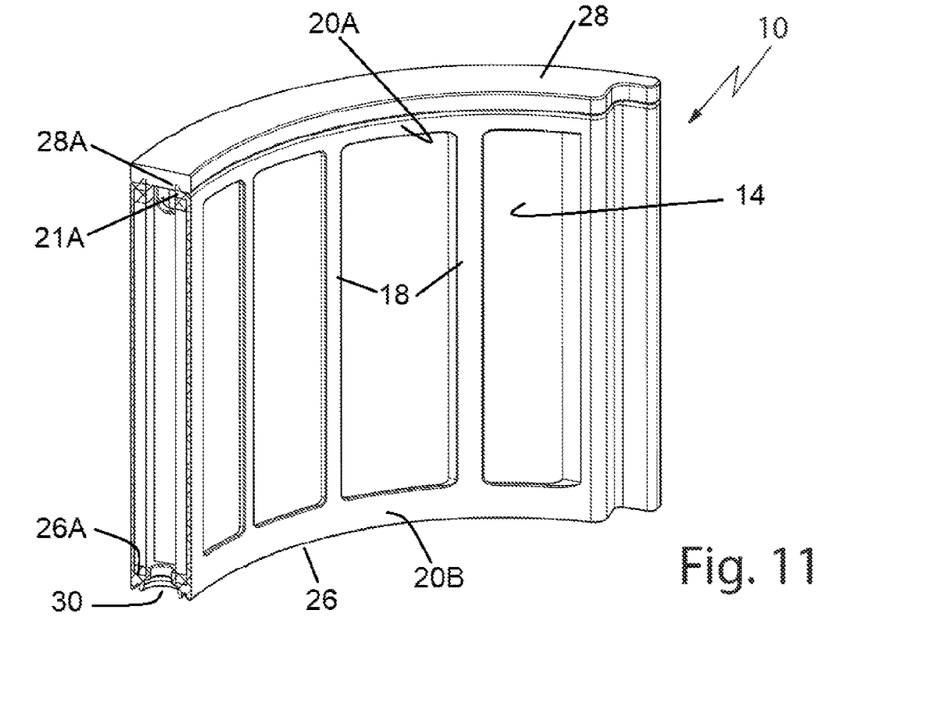

As can be seen in FIG. 4, as well as in FIGS. 9-11, the filter element 10 is approximately kidney shaped, and has a top end plate 28 and a bottom end plate 26. A kidney shaped upper transverse web 20A has a continuous protrusion 21A extending from a surface thereof. The kidney shaped lower transverse web 20B has a groove 26A formed in an inner side. A lower edge of the filter medium 14 is received into the inner side groove 26A. A plurality of spaced longitudinal webs 18 extend between the upper transverse web 20A and the lower transverse web 20B and are arranged about a circumference of the kidney shaped interior. The continuous protrusion 21A sealing engages a peripheral groove 28A of the top end plate 28. An outlet 30 is provided in the bottom end plate 26 to permit filtered fluid to exit the interior of the filter element.

Figure 5:
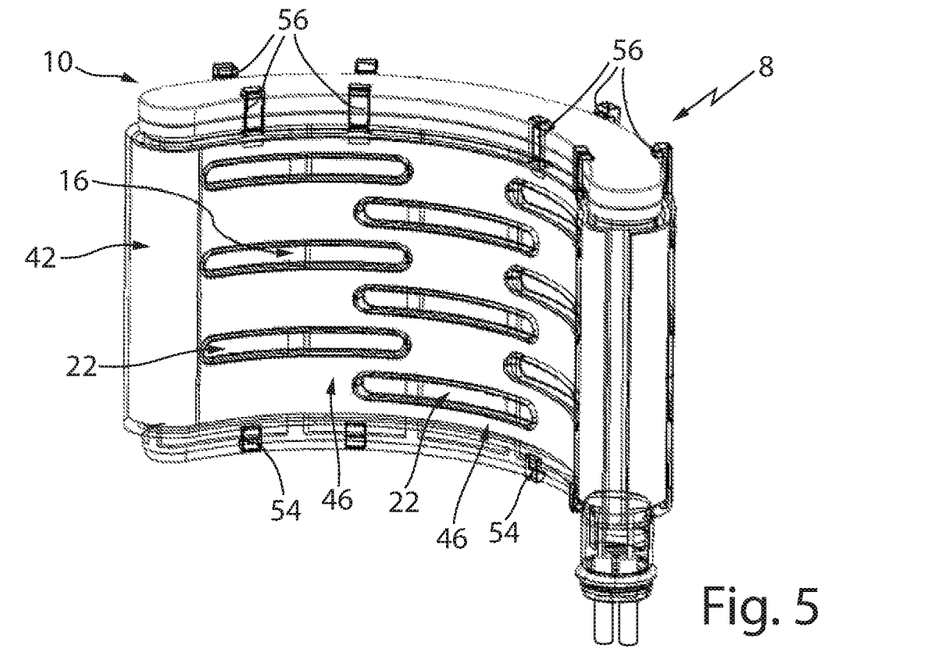
FIG. 5 shows a filter element arrangement with the filter element according to FIG. 4 and a heating device attached to it for heating the fluid.

FIG. 5 shows a filter element arrangement 8, which has the filter element 10 from FIG. 4 with a heating device 42 fastened onto it. The filter element 10 has the supporting element 16. The heating device 42 has a design similar to that of the heating device 42 shown in FIG. 3. The through-openings 22 of the individual rows 46 of the heating device 42 may overlap one another in the axial direction. In addition, the fastening means 54, 56 are all designed as catch elements.

Figure 6:
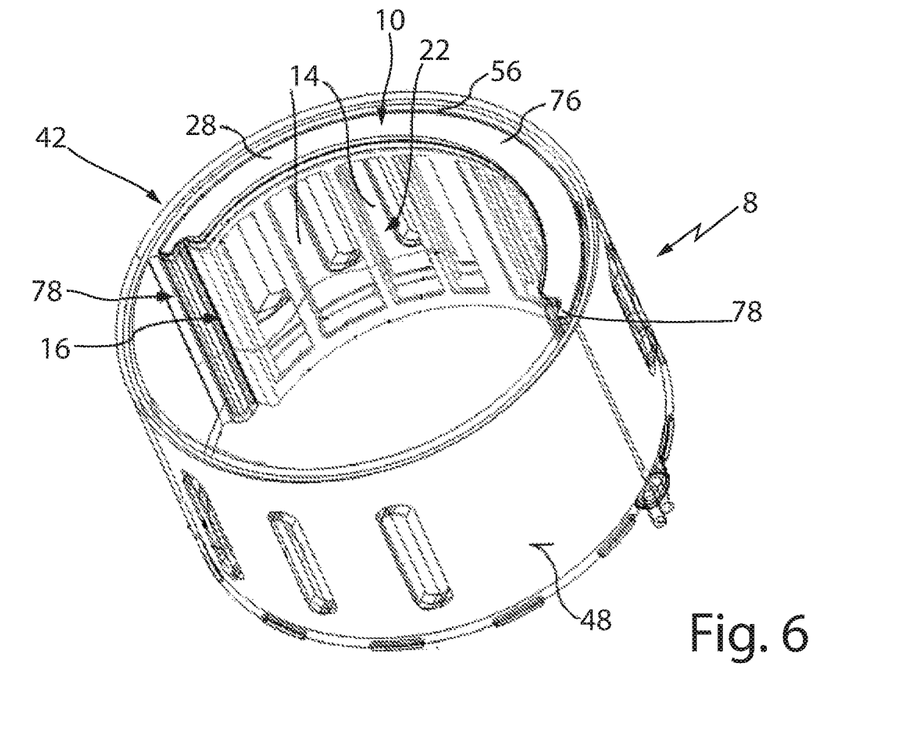
FIGS. 6, 7 show another filter element arrangement, wherein a filter medium is arranged, so that it is held embedded in the material of the supporting body in a manner corresponding to that of the filter element shown in FIG. 4 and having a heating device that is closed in the form of a circle, wherein the filter element is designed as shown in FIG. 11 and is inserted into the heating device by means of a tongue-and-groove principle.
Figure 7:
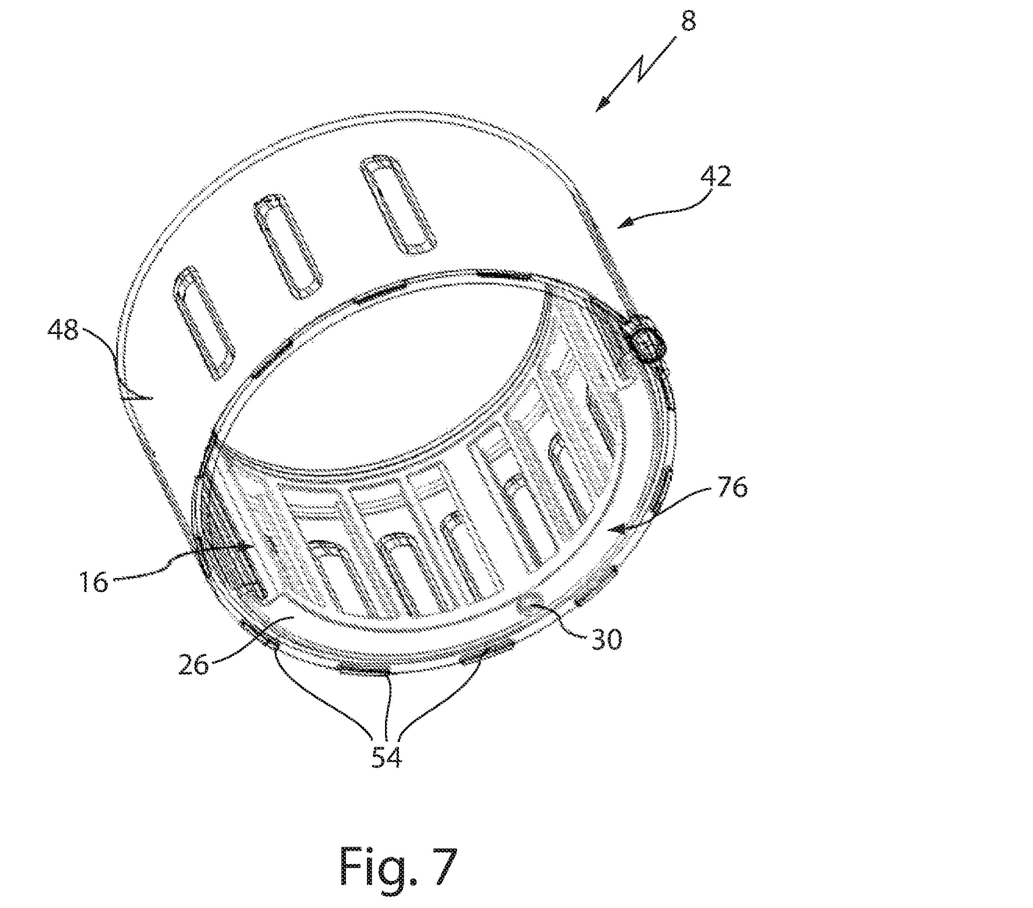

FIGS. 6 and 7 show another exemplary embodiment of a filter element arrangement 8 with a filter element 10 and a heating device 42. The filter element 10 has a circular shape. The filter element 10 is designed in two parts and has two filter element half-shells 76, only one filter element half-shell 76 of which is shown here in order to simplify the figure. The two half-shells 76 of the filter element 10 may be profiled, so that they are complementary to one another on their facing edge regions 78, so these develop into one another essentially without a step on the inside circumference and on the outside circumference. The filter medium 14 of the filter element 10 is fastened onto the supporting element 16, which is curved in the form of an arc of a circle in a manner corresponding to that of the filter element 10 shown in FIG. 4. The two filter element half-shells 76 each have a fluid outlet 30 on their first end disk 26 according to FIG. 7.

The plastic layer 48 of the heating device 42 has second fastening means 56, which are designed as an annular groove and forms an axial stop for the filter element 10. The filter element 10 may be inserted axially into the heating device 42 until the filter element 10 comes to a stop with its second upper end disk 28 against the upper second fastening means 56 of the heating device 42, as shown in FIGS. 6 and 7. The lower first fastening means 54 in FIGS. 6 and 7 are each designed as snap tongues and are locked onto the first end disk 26 of the filter element 10.

The through-openings 22 of the heating device 42 are arranged so they run axially in the direction of the longitudinal axis of the filter element 10. The through-openings 22 in the exemplary embodiments presented above may also be designed to be round, oval or polygonal.

FIG. 8 shows an alternative view of the filter element 10 according to FIG. 1.

FIGS. 9-11 show alternative embodiments and/or alternative diagrams of filter elements 10, as explained above with reference to FIGS. 6 and 7. The filter elements 10 are shown as partial sectional views for the sake of better illustration.

In summary, the invention relates to a filter element for a fluid, having an elongated grid-type supporting element and a filter medium, which is supported on the supporting element, such that the fluid can flow through the filter medium in a direction radially to the longitudinal axis of the filter element. The supporting element according to the invention is preferably designed as a grid plate or as a supporting screen. The invention also relates to a filter element arrangement having such a filter element and a heating device by means of which the fluid can be heated.

What is claimed is:

1. A filter element for a fluid comprising:
   a kidney shaped top end plate having a peripheral groove therein;
   a kidney shaped bottom end plate having a groove therein;
   a filter medium;
   a supporting element cage defining a kidney shaped interior and integrally molded on said filter medium, said supporting element cage including:
   a kidney shaped upper transverse web having a continuous protrusion extending from a surface thereof;
   a kidney shaped lower transverse web with a groove formed in an inner side, a lower edge of the filter medium being received within the inner side groove;
   a plurality of spaced longitudinal webs extending between said upper transverse web and said lower transverse web, the plurality of spaced longitudinal webs arranged about a circumference of the kidney shaped interior;
   wherein said continuous protrusion extending from the upper transverse web sealingly engages the peripheral groove of the top end plate;

wherein the kidney shaped lower transverse web includes the bottom end plate;

wherein both the kidney shaped top end plate and the kidney shaped bottom end plate are closed end plates which close over the kidney shaped interior of the of the supporting element vage of the filter element, with an exception that an outlet port is provided on in at least one of said closed end plates to permit filtered fluid to exit the interior of the supporting element cage of the filter element.

2. The filter element according to claim 1, wherein the filter medium together with the supporting element cage, forms a closed ring around the kidney shaped interior.

3. The filter element according to claim 1, wherein the supporting element cage is made of a plastic material and/or formed by injection molding.

4. The filter element according to claim 1, wherein the supporting element cage defines a curvature along an extent of its width.

\* \* \* \* \*